United States Patent
Lee et al.

(10) Patent No.: US 9,747,822 B2
(45) Date of Patent: Aug. 29, 2017

(54) ROLLABLE DISPLAY DEVICE

(71) Applicant: SAMSUNG DISPLAY CO., LTD., Yongin, Gyeonggi-Do (KR)

(72) Inventors: Junghun Lee, Hwaseong-si (KR); Youn Joon Kim, Seoul (KR); Sangjo Lee, Hwaseong-si (KR); Jang Doo Lee, Suwon-si (KR); Jusuck Lee, Seoul (KR); Mi Jang, Suwon-si (KR); Kyungmin Choi, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 7 days.

(21) Appl. No.: 14/789,078

(22) Filed: Jul. 1, 2015

(65) Prior Publication Data
US 2016/0163241 A1    Jun. 9, 2016

(30) Foreign Application Priority Data
Dec. 8, 2014  (KR) .................. 10-2014-0174810

(51) Int. Cl.
| | | |
|---|---|---|
| *G09F 17/00* | (2006.01) | |
| *G09F 15/00* | (2006.01) | |
| *G09F 9/30* | (2006.01) | |
| *G06F 1/16* | (2006.01) | |
| *G09F 11/29* | (2006.01) | |

(52) U.S. Cl.
CPC .......... *G09F 15/0056* (2013.01); *G09F 9/301* (2013.01); *G06F 1/1652* (2013.01); *G09F 11/29* (2013.01)

(58) Field of Classification Search
CPC .......... G09F 11/26; G09F 11/29; G09F 15/02; G09F 15/0025; G09F 2013/0472; G09F 15/0018; G09F 21/04; B44C 5/02; A47G 2001/0661; B44D 3/185
USPC ........................................................... 40/584
See application file for complete search history.

(56) References Cited

U.S. PATENT DOCUMENTS

| | | | | |
|---|---|---|---|---|
| 6,052,932 | A * | 4/2000 | Reddig | G09F 15/0087 312/287 |
| 6,293,038 | B1 * | 9/2001 | Chang | A47G 1/0616 40/711 |
| 7,350,325 | B1 * | 4/2008 | Wang | G09F 11/29 40/514 |
| 7,520,074 | B1 * | 4/2009 | Vanova | G09F 21/02 116/173 |
| 7,584,563 | B2 * | 9/2009 | Hillstrom | G09F 15/0056 248/346.2 |
| 7,636,085 | B2 | 12/2009 | Yang | |
| 7,882,652 | B2 * | 2/2011 | Elliott | G09F 15/0025 248/125.7 |
| 7,941,951 | B2 * | 5/2011 | Hillstrom | G09F 15/0056 248/346.2 |

(Continued)

FOREIGN PATENT DOCUMENTS

KR      10-0781708 B1    11/2007

*Primary Examiner* — Shin Kim
(74) *Attorney, Agent, or Firm* — Lee & Morse P.C.

(57) ABSTRACT

A rollable display device includes a flexible display panel displaying an image, a housing accommodating the flexible display panel in a rolled state, the housing having a bent opening portion through which the flexible display panel is pulled out, and a grip attached to the flexible display panel, the grip pulling the flexible display panel out of the housing by an external force.

20 Claims, 8 Drawing Sheets

(56) References Cited

U.S. PATENT DOCUMENTS

| | | | |
|---|---|---|---|
| 7,963,059 B2* | 6/2011 | Fritsche | G09F 15/0025 40/603 |
| 8,001,711 B2 | 8/2011 | LaFarre et al. | |
| 8,009,421 B2 | 8/2011 | Misawa | |
| 8,009,422 B2 | 8/2011 | Misawa | |
| 8,466,873 B2 | 6/2013 | Vertegaal et al. | |
| 2004/0159031 A1* | 8/2004 | Chang | A47G 1/0616 40/800 |
| 2006/0007368 A1 | 1/2006 | Slikkerveer et al. | |
| 2006/0117624 A1* | 6/2006 | Hillstrom | G09F 15/0056 40/607.01 |
| 2006/0207142 A1* | 9/2006 | Kochan | G09F 11/29 40/604 |
| 2007/0011925 A1* | 1/2007 | Edwards | G09F 17/00 40/604 |
| 2007/0241002 A1 | 10/2007 | Wu et al. | |
| 2012/0307423 A1 | 12/2012 | Bohn et al. | |
| 2012/0311900 A1* | 12/2012 | Andrews | G09F 11/30 40/533 |

* cited by examiner

ROLLABLE DISPLAY DEVICE

CROSS-REFERENCE TO RELATED APPLICATION

Korean Patent Application No. 10-2014-0174810, filed on Dec. 8, 2014, in the Korean Intellectual Property Office, and entitled: "Rollable Display Device," is incorporated by reference herein in its entirety.

BACKGROUND

1. Field

The present disclosure herein relates to a rollable display device, and more particularly, to a rollable display device having improved display quality.

2. Description of the Related Art

Flexible display devices are being developed as demand in markets increases. Flexible display devices may include a curved display device that is fixed with a specific curvature, a foldable display device that is bent at a specific radius of curvature or folded about a folding shaft, and a rollable display device that is rollable with a specific radius of curvature. For example, the rollable display device has many advantages, e.g., a wide display area and excellent portability.

SUMMARY

The present disclosure provides a rollable display device capable of increasing a display quality.

Embodiments provide rollable display devices including a flexible display panel displaying an image, a housing accommodating the flexible display panel in a rolled state, the housing having a bent opening portion through which the flexible display panel is pulled out, and a grip attached to the flexible display panel, the grip pulling the flexible display panel out of the housing by an external force.

In some embodiments, the opening portion may have a radius of curvature.

In other embodiments, the opening portion may include a first opening portion line, a second opening portion line, a third opening portion line, and a fourth opening portion line. The second opening portion line may be spaced apart from the first opening portion line. The third opening portion line may be connected to each of the first opening portion line and the second opening portion line. The fourth opening portion line may be connected to each of the first opening portion line and the second opening portion line and spaced apart from the third opening portion line. Each of the first opening portion line and the second opening portion line may be bent.

In still other embodiments, each of the first opening portion line and the second opening portion line may be a curved line. Each of the third opening portion line and the fourth opening portion line may be a portion of a straight line.

In even other embodiments, the first opening portion line may have a first radius of curvature, and the second opening portion line may have a second radius of curvature. The second radius of curvature may be greater than the first radius of curvature.

In yet other embodiments, the third opening portion line and the fourth opening portion line may be parallel to each other.

In further embodiments, the opening portion may have a uniform width.

In still further embodiments, the grip may be connected to the flexible display panel and have a bent coupling recess.

In even further embodiments, the coupling recess may have a radius of curvature.

In yet further embodiments, the flexible display panel may include an inner panel, an external panel, and a connection panel. The inner panel may be stored in the housing. The external panel may be exposed to the outside of the housing. The connection panel may connect the inner panel to the external panel. Each of the external panel and the connection panel may be bent.

In much further embodiments, each of the external panel and the connection panel may have a radius of curvature.

In still much further embodiments, the external panel may have a multi-radius curvature. The external panel may have a multi-radius curvature that gradually decreases toward the housing and gradually increases toward the grip.

In even much further embodiments, the connection panel may pass through the opening portion. The external panel may include a first display panel and a second display panel. The first display panel may be coupled to the coupling recess. The second display panel may be connected to each of the connection display unit and the first display panel. Each of the first display panel and the second display panel may be bent.

In yet much further embodiments, the connection panel may have a third radius of curvature, the first display panel may have a fourth radius of curvature, and the second display panel may have a fifth radius of curvature. The third radius of curvature may be less than the fifth radius of curvature.

In much still further embodiments, the third radius of curvature may be less than the fourth radius of curvature, and the fifth radius of curvature may be less than the fourth radius of curvature.

In even still further embodiments, the coupling recess may include a first coupling recess line, a second coupling recess line, a third coupling recess line, and a fourth coupling recess line. The second coupling recess line may be spaced apart from the first coupling recess line. The third coupling recess line may be connected to each of the first coupling recess line and the second coupling recess line. The fourth coupling recess line may be connected to each of the first coupling recess line and the second coupling recess line and spaced apart from the third coupling recess line. Each of the third coupling recess line and the fourth coupling recess line may be bent.

In yet still further embodiments, each of the first coupling recess line and the second coupling recess line may be a curved line. Each of the third coupling recess line and the fourth coupling recess line may be a portion of a straight line.

In much even further embodiments, the first coupling recess line may have a sixth radius of curvature, and the second coupling recess line may have a seventh radius of curvature that is greater than the sixth radius of curvature.

In still even further embodiments, the sixth radius of curvature may be greater than the first radius of curvature, and the seventh radius of curvature is greater than the second radius of curvature.

In yet even further embodiments, the third coupling recess line and the fourth coupling recess line may be parallel to each other.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1A:
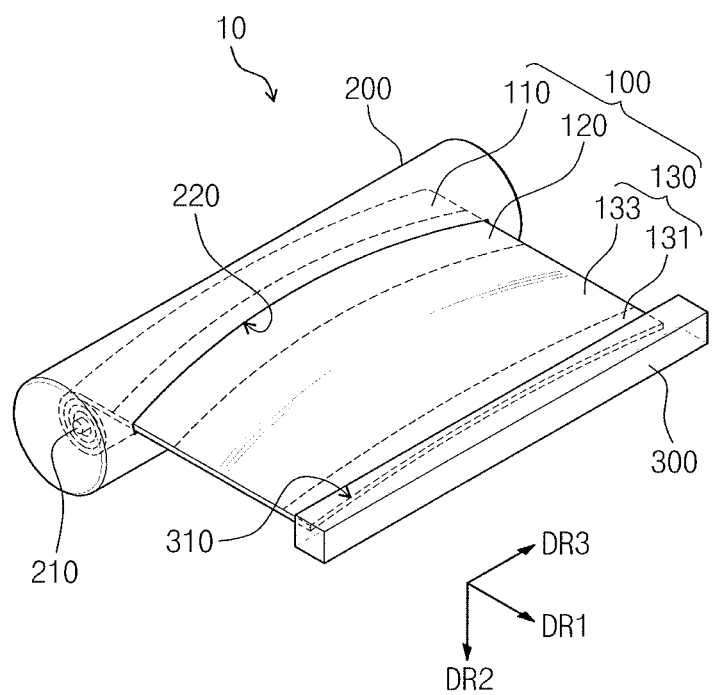
FIGS. 1A and 1B illustrate schematic perspective views of a rolled and unrolled rollable display device, respectively, according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of elements and regions may be exaggerated for clarity of illustration. It will also be understood that when a layer or element is referred to as being "on" another element or substrate, it can be directly on the other element or substrate, or intervening elements may also be present. In addition, it will also be understood that when a element is referred to as being "between" two elements, it can be the only element between the two elements, or one or more intervening elements may also be present. Like reference numerals refer to like elements throughout.

Hereinafter, a rollable display device according to an embodiment will be described.

Figure 1B:
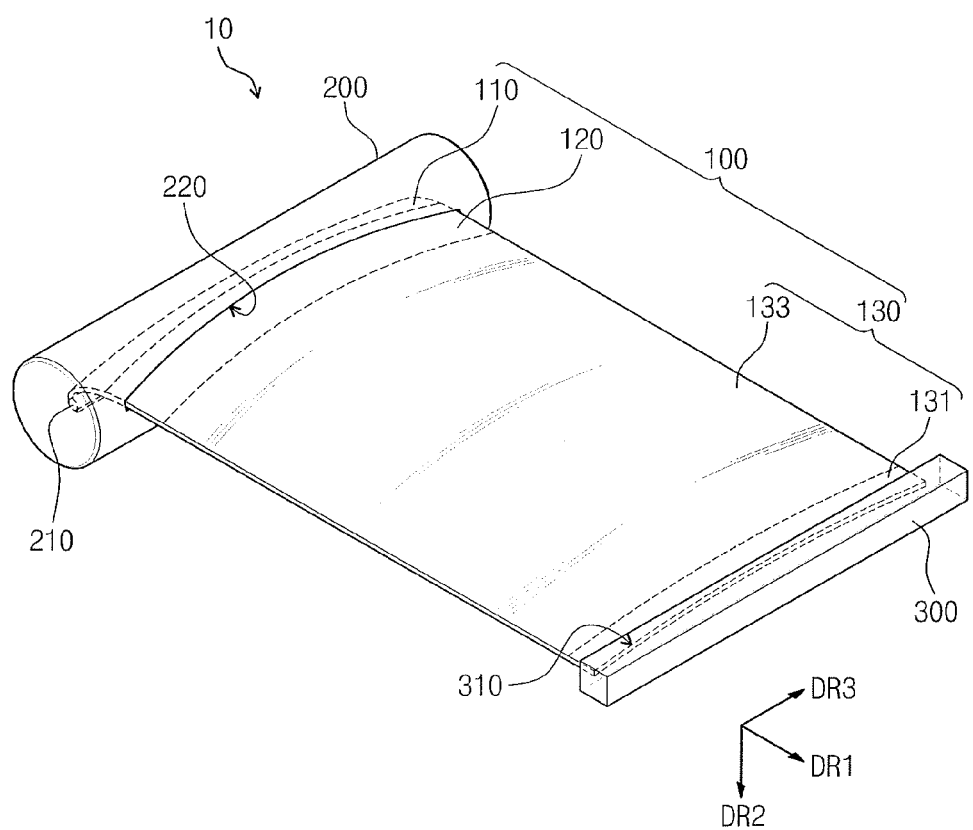
Figure 1C:
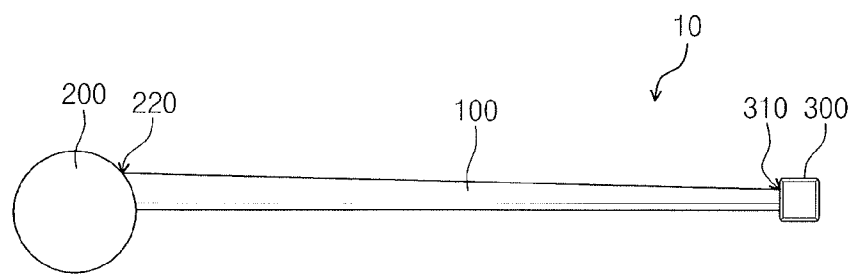
FIG. 1C illustrates a schematic side view of a rollable display device according to an embodiment.

FIGS. 1A and 1B are schematic views of a rollable display device according to an embodiment. FIG. 1C is a schematic side view of the rollable display device according to an embodiment.

Referring to FIGS. 1A, 1B, and 1C, a rollable display device 10 according to an embodiment may include a flexible display panel 100, a housing 200, and a grip 300. The flexible display panel 100 displays an image. The housing 200 has an opening portion 220. The grip 300 has a coupling recess 310.

Referring to FIG. 1A, the flexible display panel 100 is stored in the housing 200 in a state where the flexible display panel 100 is rolled. Referring to FIG. 1B, the grip 300 is attached to an edge of the flexible display panel 100, i.e., the grip 300 is external to the housing 200, and exposes the flexible display panel 100 to the outside of the housing 200 by an external force, e.g., facilitates pulling the flexible display panel 100 out of the housing 200.

Referring to FIGS. 1A, 1B, and 1C, the flexible display panel 100 may be flexible by adopting, e.g., implementing, a substrate formed of a flexible material. The flexible material for forming the substrate may include, but is not particularly limited, at least one of polycarbonate (PC), polyethylene terephthalate (PET), polyethylene (PE), polypropylene (PP), polysulfone (PSF), polymethyl methacylate (PMMA), cellulose triacetate (TAC), a cycloolefin polymer (COP), and a cycloolefin copolymer (COC).

The flexible display panel 100 may be rolled around or unrolled from a reel core 210 with respect to at least one rolling shaft in the housing 200. The flexible display panel 100 may be exposed to the outside of the housing 200 by an external force. For example, the flexible display panel 100 stored in the rolled state within the housing 200 may be exposed to the outside by passing through the opening portion 220 of the housing 200 after being pulled by the external force. The opening portion 220 of the housing 200 will be described later in more detail.

The housing 200 stores the flexible display panel 100. Although the housing 200 having an approximately cylindrical shape is exemplified in FIGS. 1A and 1B, the present disclosure is not limited thereto. If the flexible display panel 100 is stored in a rolled state within the housing 200, the housing 200 may have various shapes. Also, although an integrated housing is exemplified in FIGS. 1A and 1B, the present disclosure is not limited thereto, e.g. the housing 200 may be manufactured by coupling at least two sub housings to each other.

The housing 200 may include the reel core 210 around which the flexible display panel 100 is rolled with respect to the rolling shaft. For example, the rolling shaft may be parallel to a third direction (DR3 direction) that is perpendicular to each of a first direction (DR1 direction) and a second direction (DR2 direction). The reel core 210 may have a cylindrical shape extending long along the rolling shaft.

The flexible display panel 100 is stored in the rolled state within the housing 200. For example, the flexible display panel 100 may be connected to the reel core 210 provided in the housing 200 and then be rolled or unrolled. Although the flexible display panel 100 that surrounds a cylindrically-shaped reel core 210 is exemplified in FIGS. 1A and 1B, the present disclosure is not limited thereto, e.g., the reel core 210 may include a display panel coupling recess coupled to the flexible display panel 100. Further, although an integrated the reel core 210 is exemplified in FIGS. 1A and 1B, the present disclosure is not limited thereto, e.g., the reel core 210 may be manufactured by coupling at least two sub reel cores to each other.

Figure 2A:
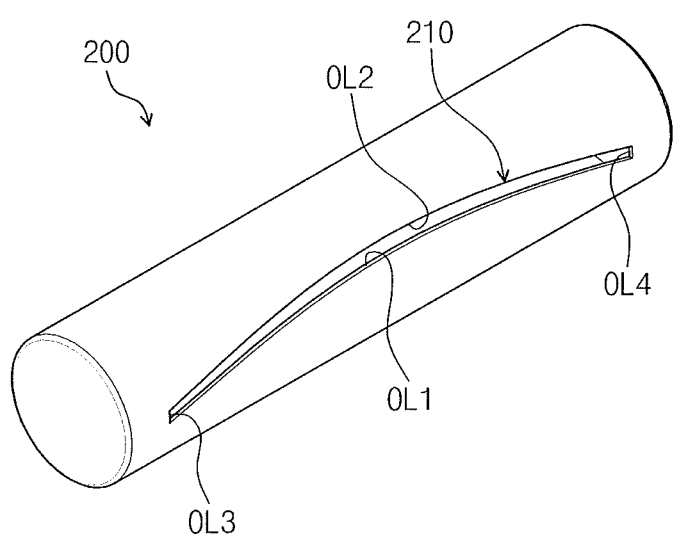
FIG. 2A illustrates a schematic perspective view of a housing provided in a rollable display device according to an embodiment.
Figure 2B:
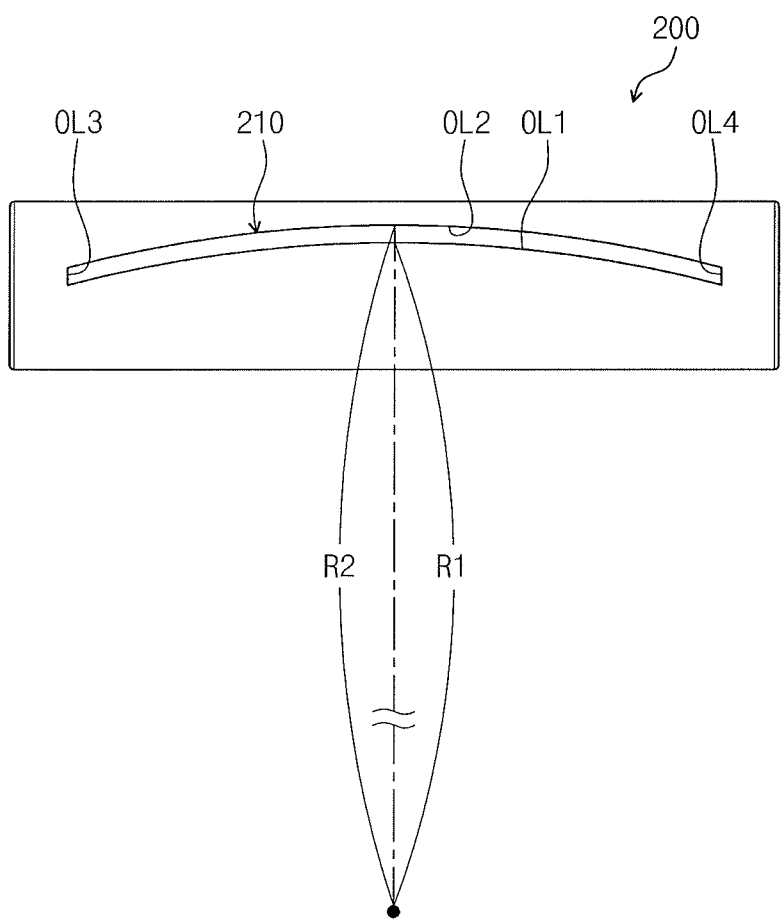
FIG. 2B illustrates a schematic plan view of a housing provided in a rollable display device according to an embodiment.

FIG. 2A is a schematic perspective view of the housing 200. FIG. 2B is a schematic plan view of the housing 200.

Referring to FIGS. 1A-2B, the housing 200 may include the opening portion 220. As described previously, the flexible display panel 100 may be exposed to the outside of the housing 200 through the opening portion 220 or be accommodated in the housing 200.

The flexible display panel 100 is bent while passing through the opening portion 220. Therefore, the opening portion 220 may be sufficiently spaced apart from the rolling shaft 210, e.g., along the first direction DR1, to facilitate rolling and unrolling of the flexible display panel 100 around the rolling shaft 210 in a bent state while passing through the opening portion 220.

In detail, the opening portion 220 may be bent. That is, the opening portion 220 may have a predetermined radius of curvature, so the flexible display panel 100 passing through the opening portion 220, and then being exposed to the outside, may have the same predetermined radius of curvature as the opening portion 220. In other words, the bent opening portion 220 may impart the same predetermined radius of curvature to the flexible display panel 100 pulled therethrough.

The opening portion 220 may have a uniform width, e.g., along the second direction DR2, but is not limited thereto, e.g., the opening portion 220 may have a non-uniform width. For example, the opening portion 220 may have a width that gradually increases toward a center of the housing 200 and gradually decreases toward an end of the housing 200.

Referring to FIGS. 2A-2B, the opening portion 220 includes a first opening portion line OL1, a second opening portion line OL2, a third opening portion line OL3, and a fourth opening portion line OL4. The first opening portion line OL1 is spaced apart from the second opening portion line OL2, e.g., along the second direction DR2. The first opening portion line OL1 is connected to each of the third opening portion line OL3 and the fourth opening portion line OL4.

The first opening portion line OL1 may be bent, e.g., the first opening portion line OL1 may be a curved line. For example, the first opening portion line OL1 may be a portion of a circle, an oval, a parabola, a hyperbola, or the like. The first opening portion line OL1 may have a first radius of curvature R1, as illustrated in FIG. 2B.

The second opening portion line OL2 is spaced apart from the first opening portion line OL1. The second opening portion line OL2 may be disposed on, e.g., above, the first opening portion line OL1. The second opening portion line OL2 is connected to each of the third opening portion line OL3 and the fourth opening portion line OL4.

The second opening portion line OL2 may be bent, e.g., the second opening portion line OL2 may be a curved line. For example, the second opening portion line OL2 may be a portion of a circle, an oval, a parabola, a hyperbola, or the like. The second opening portion line OL2 may have a second radius of curvature R2, as illustrated in FIG. 2B. The second radius of curvature R2 is greater than the first radius of curvature R1.

The third opening portion line OL3 is connected to each of the first opening portion line OL1 and the second opening portion line OL2. The third opening portion line OL3 may be a portion of a straight line.

The fourth opening portion line OL4 is spaced apart from the third opening portion line OL3. The fourth opening portion line OL4 is connected to each of the first opening portion line OL1 and the second opening portion line OL2. The fourth opening portion line OL4 may be a portion of a straight line.

The third opening portion line OL3 and the fourth opening portion line OL4 may be parallel to each other, but embodiments are not limited thereto. For example, each of the third opening portion line OL3 and the fourth opening portion line OL4 may be disposed in various shapes, while being a portion of a straight line, to connect the first opening portion line OL1 to the second opening portion line OL2.

Figure 3A:
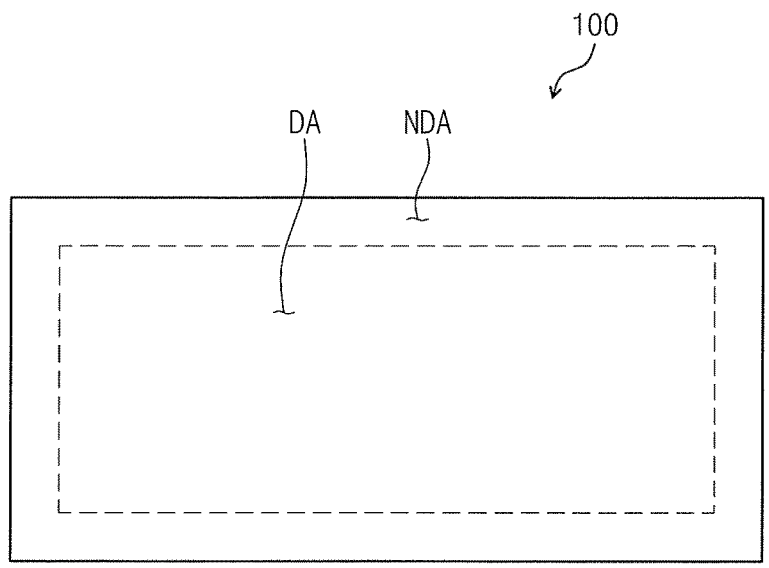
FIGS. 3A and 3B illustrate schematic plan views of a flexible display panel provided in a rollable display device according to an embodiment.

FIG. 3A is a schematic plan view of the flexible display panel 100.

Referring to FIGS. 1A-1C and 3A, the flexible display panel 100 may have an approximately rectangular shape in top view, e.g., when viewed in a thickness direction of the flexible display panel 100 (the second direction DR2), but is not limited thereto. For example, when viewed in the thickness direction of the flexible display panel 100, the flexible display panel 100 may have various shapes.

The flexible display panel 100 includes a display area DA and a non-display area NDA. The non-display area may surround the display area DA. The display area DA may have an approximately rectangular shape when viewed in the thickness direction (the DR2 direction) of the flexible display panel 100, but is not limited thereto.

The display area DA displays an image. Although not shown, a plurality of pixels, each of which is a minimum unit for forming an image, may be disposed on the display area DA. Each of the pixels may include at least one thin film transistor.

The non-display area NDA does not display an image. Although not shown, a driving unit that is electrically connected to the pixels to provide signals for displaying images may be disposed on the non-display area NDA. The driving unit may include a data driver for converting an image signal into a data signal to transmit the converted data signal to the flexible display panel 100, and a gate driver for converting an image signal to a gate signal to transmit the converted gate signal to the flexible display panel 100, but is not limited thereto. For example, at least one of the data driver and the gate driver may be provided as one chip on a tape carrier package or printed circuit board.

Although not shown, the flexible display panel 100 may include a base substrate and an image display unit. The base substrate may be a transparent insulation substrate, e.g., the base substrate may be formed of at least one of polycarbonate (PC), polyethylene terephthalate (PET), polyethylene (PE), polypropylene (PP), polysulfone (PSF), polymethyl methacylate (PMMA), cellulose triacetate (TAC), a cycloolefin polymer (COP), and a cycloolefin copolymer (COC).

When viewed in the thickness direction (the DR2 direction) of the flexible display panel 100, the base substrate may have an approximately rectangular shape, but is not limited thereto. That is, when viewed in the thickness direction (the DR2 direction) of the flexible display panel 100, the base substrate may have various shapes.

The image display unit is disposed on the base substrate to display an image. The image display unit may emit light or control incident light. The image display unit may include various types of display devices that are adoptable to the rollable display device 10. For example, the image display unit may be at least one of an electrophoresis display device, an electrowetting display device, and an organic light emitting display device. Hereinafter, the image display unit that is provided as the organic light emitting display device will be exemplified.

The image display unit may include an anode electrode, an organic light emitting layer, and a cathode electrode. In the image display unit, holes injected from the anode electrode and electrons injected from the cathode electrode are combined with each other within the organic light emitting layer to form excitons. The image display unit emits light by using energy generated while each of the excitons returns from an excited state to a ground state.

Figure 3B:
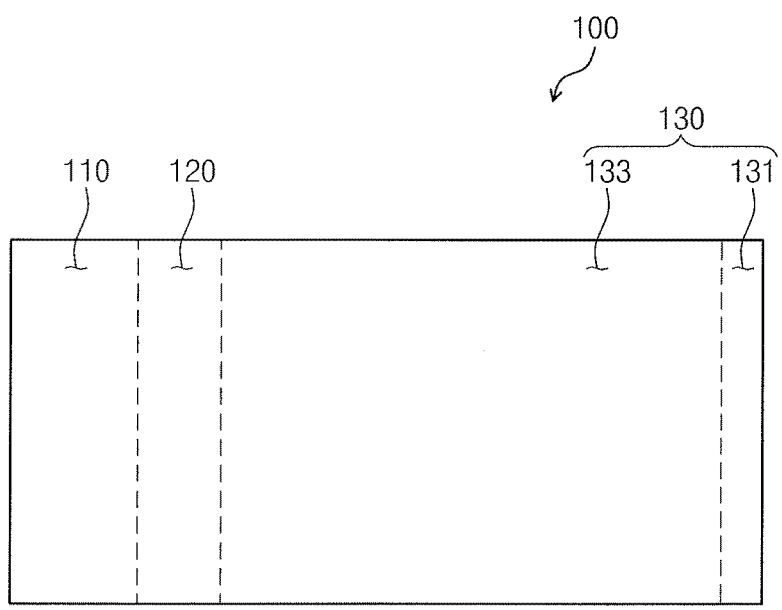
Figure 3C:
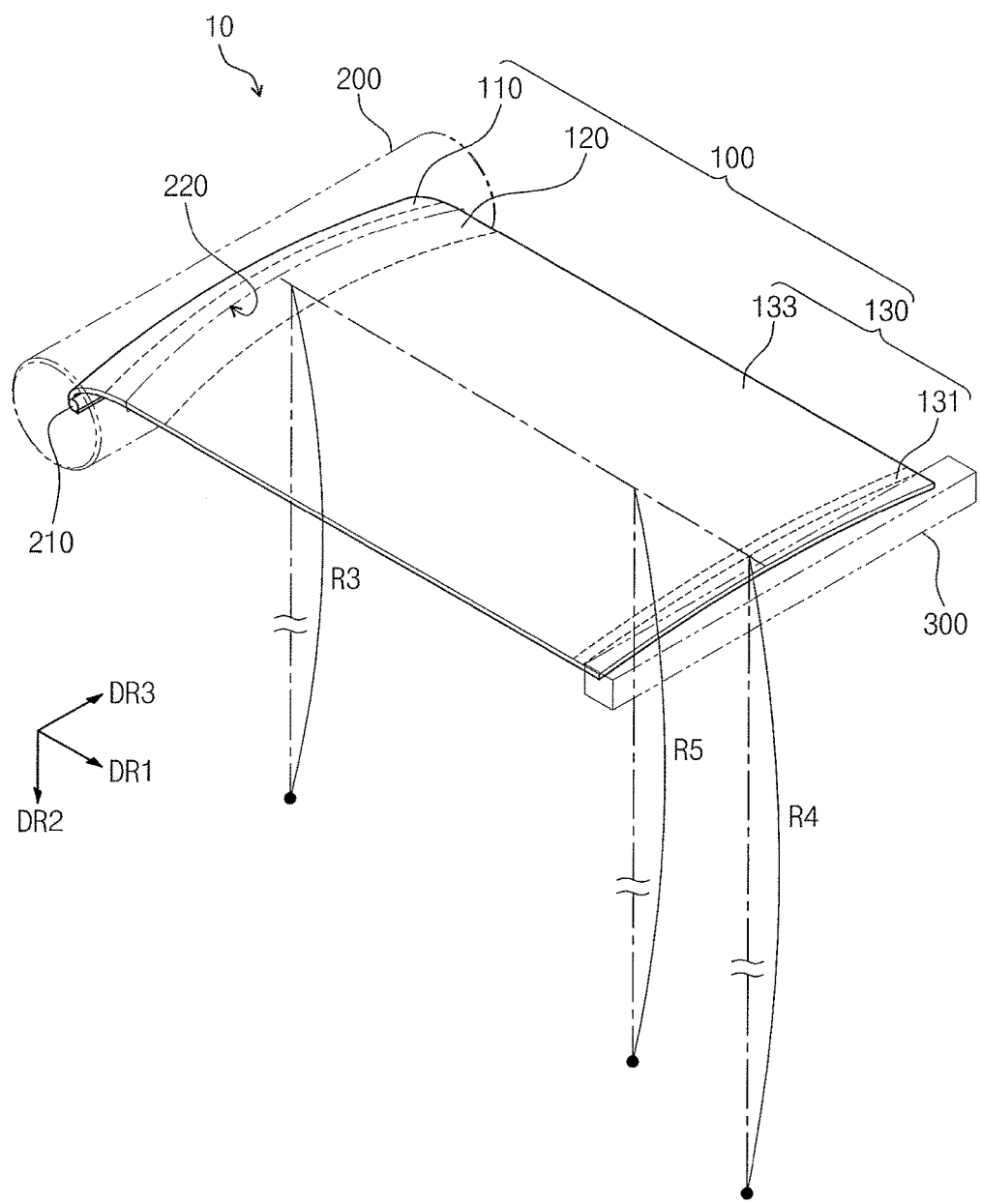
FIG. 3C illustrates a schematic perspective view of a flexible display panel provided in a rollable display device according to an embodiment.

FIG. 3B is a schematic plan view of the flexible display panel 100. FIG. 3C is a schematic perspective view of the flexible display panel 100.

Referring to FIGS. 1A-1C and 3B-3C, the flexible display panel 100 includes an inner panel 110, a connection panel 120, and an external panel 130. The inner panel 110, the connection panel 120, and the external panel 130 may be connected in sequence in the first direction DR1. Although each of the inner panel 110, the connection panel 120, and the external panel 130 has a convex shape when viewed in the thickness direction, i.e., the second direction DR2, the present disclosure is not limited thereto. For example, each of the inner panel 110, the connection panel 120, and the external panel 130 may have a concave shape.

The inner panel 110 may be stored in the housing 200, e.g., the inner panel 110 may not be extended outside of the housing 200. The inner panel 110 is connected to the connection panel 120. The inner panel 110 may be stored in a rolled state within the housing 200. For example, the inner panel 110 is directly connected to the reel core 210 of the housing 200, and then rolled or unrolled within the housing 200.

The connection panel 120 passes through the opening portion 220. The connection panel 120 connects the inner panel 110 to the external panel 130. The connection panel 120 may be bent. The connection panel 120 may have a radius of curvature. The connection panel 120 may have a third radius of curvature R3. For example, the connection panel 120 may have top and bottom surfaces, and the bottom surface of the connection panel 120, i.e., a surface facing the first opening portion line OL1, may have the third radius of curvature R3. In another example, when viewed in the thickness direction of the flexible display panel 100, the top surface of the connection panel 120, i.e., a surface facing the second opening portion line OL2, may have the third radius of curvature R3 if the connection panel 120 has a concave shape.

The third radius of curvature R3 may be smaller than each of a fourth radius of curvature R4 of a first display panel 131 and a fifth radius of curvature R5 of a second display panel 133, but is not limited thereto. The third radius of curvature R3 may be equal to at least one of the fourth radius of curvature R4 and the fifth radius of curvature R5. The first and second display panels 131 and 133 will be described in more detail below.

The external panel 130 is exposed to the outside of the housing 200. The external panel 130 is connected to the connection panel 120. The external panel 130 may be bent. The external panel 130 may have a radius of curvature.

The external panel 130 may have a multi-radius curvature. The external panel 130 may have a radius of curvature that gradually decreases toward the housing 200 and gradually increases toward the grip 300, but is not limited thereto. For example, the external panel 130 may have a single radius of curvature.

The external panel 130 includes the first display panel 131 and the second display panel 133. The first display panel 131 and the second display panel 133 are connected to each other.

The first display panel 131 is connected to the coupling recess 310 in the grip 300. The first display panel 131 may be bent. The first display panel 131 may have the fourth radius of curvature R4. For example, the first display panel 131 may include top and bottom surfaces, and the bottom surface of the first display panel 131 may have the fourth radius of curvature R4. In another example, when viewed in the thickness direction (the DR2 direction) of the flexible display panel 100, the top surface of the first display panel 131 may have the fourth radius of curvature R4 if the first display panel 131 has a concave shape.

The fourth radius of curvature R4 may be greater than each of the third radius of curvature R3 and the fifth radius of curvature R5, but is not limited thereto. The fourth radius of curvature R4 may be equal to at least one of the third radius of curvature R3 and the fifth radius of curvature R5.

The second display panel 133 is connected to each of the connection panel 120 and the first display panel 131. The second display panel 133 may be bent. The second display panel 133 may have the fifth radius of curvature R5. For example, the second display panel 133 may include top and bottom surfaces, and the bottom surface of the second display panel 133 may have the fifth radius of curvature R5. In another example, when viewed in the thickness direction (the DR2 direction) of the flexible display panel 100, the top surface of the second panel 133 may have the fifth radius of curvature R5 if the second display panel 133 has a concave shape.

The fifth radius of curvature R5 may be greater than the third radius of curvature R3 and smaller than the fourth radius of curvature R4, but is not limited thereto. The fifth radius of curvature R5 may be equal to at least one of the third radius of curvature R3 and the fourth radius of curvature R4.

Figure 4A:
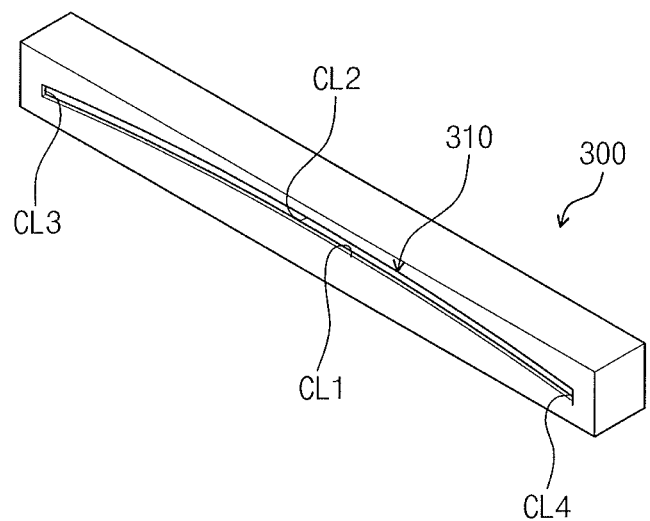
FIG. 4A illustrates a schematic perspective view of a grip provided in a rollable display device according to an embodiment.
Figure 4B:
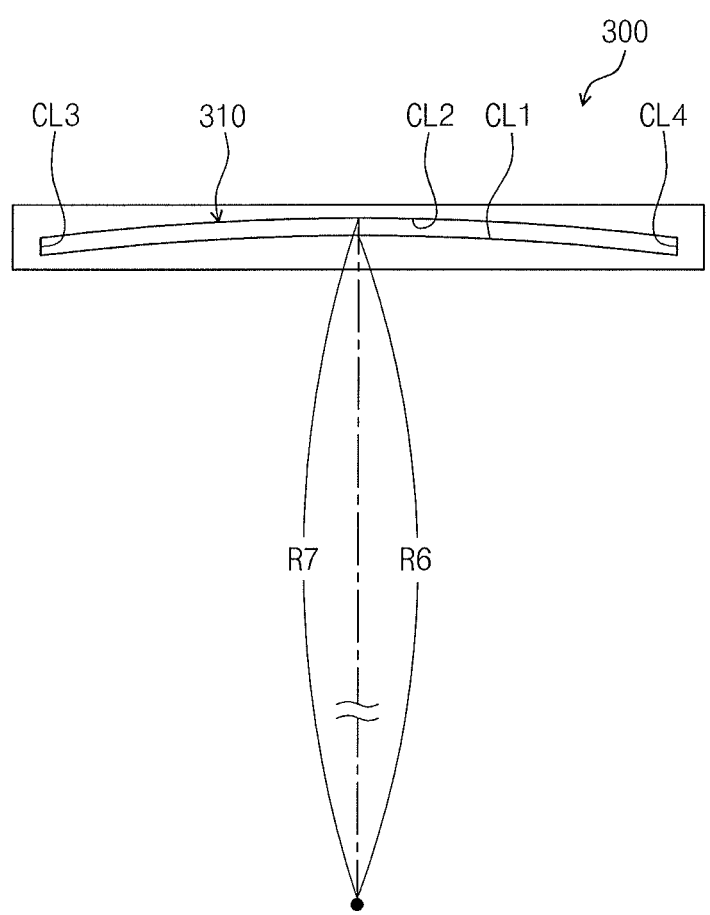
FIG. 4B illustrates a schematic plan view of a grip provided in a rollable display device according to an embodiment.

FIG. 4A is a schematic perspective view of the grip 300. FIG. 4B is a schematic plan view of the grip 300.

Referring to FIGS. 1A-1C and 4A-4B, the grip 300 exposes the flexible display panel 100 to the outside of the housing 200 by using an external force. Although the grip 300 having a straight shape is exemplified in FIGS. 1A, 1B, 4A, and 4B, the present disclosure is not limited thereto. For example, the grip 300 may be bent, e.g., the grip 300 may have a convex shape when viewed in the thickness direction (the DR2 direction) of the flexible display panel 100.

The grip 300 may have the coupling recess 310 coupled to the flexible display panel 100. The coupling recess 310 may be bent. The coupling recess 310 may have a radius of curvature.

The coupling recess 310 may have a uniform width, but is not limited thereto, e.g., the coupling recess 310 may have a non-uniform width. For example, the coupling recess 310 may have a width that gradually increases toward a center of the housing 200 and gradually decreases toward an end of the housing 200, i.e., a varying width in the third direction DR3.

The coupling recess 310 includes a first coupling recess line CL1, a second coupling recess line CL2, a third coupling recess line CL3, and a fourth coupling recess line CL4. The first coupling recess line CL1 is spaced apart from the second coupling recess line CL2. The first coupling recess line CL1 is connected to each of the third coupling recess line CL3 and the fourth coupling recess line CL4.

The first coupling recess line CL1 may be bent. For example, the first coupling recess line CL1 may be a curved line. For example, the first coupling recess line CL1 may be a portion of a circle, an oval, a parabola, a hyperbola, or the like. The first coupling recess line CL1 may have a sixth radius of curvature R6. The sixth radius of curvature R6 may be greater than the first radius of curvature R1, but is not limited thereto, e.g., the sixth radius of curvature R6 may be equal to the first radius of curvature R1.

The second coupling recess line CL2 is spaced apart from the first coupling recess line CL1. The second coupling recess line CL2 may be disposed on, e.g., above, the first coupling recess line CL1. The second coupling recess line CL2 is connected to each of the third coupling recess line CL3 and the fourth coupling recess line CL4.

The second coupling recess line CL2 may be bent. For example, the second coupling recess line CL2 may be a curved line. For example, the second coupling recess line CL2 may be a portion of a circle, an oval, a parabola, a hyperbola, or the like. The second coupling recess line CL2 may have a seventh radius of curvature R7. The seventh radius of curvature R7 may be greater than the sixth radius of curvature R6. The seventh radius of curvature R7 may be greater than the second radius of curvature R2, but is not limited thereto, e.g., the seventh radius of curvature R7 may be equal to the second radius of curvature R2. For example, as the sixth and seventh radii of curvature R6 and R7 in the bent coupling recess 310 of the grip 300 may be larger than the first and second radii of curvature R1 and R2 in the bent opening portion 220 of the housing 200, the radius of curvature of the flexible display panel 100 may, e.g., gradually, increase from the housing 200 toward the grip 300 when pulled out.

The third coupling recess line CL3 is connected to each of the first coupling recess line CL1 and the second coupling recess line CL2. The third coupling recess line CL3 may be a portion of a straight line.

The fourth coupling recess line CL4 is spaced apart from the third coupling recess line CL3. The fourth coupling recess line CL4 is connected to each of the first coupling recess line CL1 and the second coupling recess line CL2. The fourth coupling recess line CL4 may be a portion of a straight line.

The third coupling recess line CL3 and the fourth coupling recess line CL4 may be parallel to each other, but are not limited thereto. For example, each of the third coupling recess line CL3 and the fourth coupling recess line CL4 may be disposed in various shapes, while being a portion of the straight line, to connect the first coupling recess line CL1 to the second coupling recess line CL2.

Although not shown, the rollable display device 10 according to an embodiment may further include a touch screen panel and a window member. For example, the touch screen panel may be disposed on the image display unit, and the window member may be disposed on the touch screen panel. The touch screen panel may detect a point at which a touch event occurs, and the window member protects the touch screen panel.

In case of a typical rollable display device, each portion of the typical flexible display panel exposed to the outside of the housing, e.g., a portion adjacent to the opening portion and a portion connected to the grip, is subject to a large amount of stress applied to the above-described portions of the flexible display panel. Such a large amount of stress may also be applied to and affect pixels in the flexible display panel, thereby causing defective pixels, which in turn, may cause deteriorated image quality, e.g., unclear images, due to the defective pixels.

In contrast, the rollable display device 10 according to an embodiment may include the housing 200 with the bent opening portion 220 and the grip 300 with the bent coupling recess 310. As such, the flexible display panel 100 is bent when coupled to the grip 300 and is also bent when passes through the opening portion 220 along the shape of the opening portion 220. Accordingly, stress applied to each of the portions of the flexible display panel 100 exposed to the outside of the housing 200, which are adjacent to the opening portion 220 and connected to the grip 300, may be distributed, e.g., causing reduced stress in each portion. Therefore, stress on pixels in the flexible display panel 100 may be prevented or substantially minimized, thereby minimizing defective pixels in the flexible display panel 100. Accordingly, the rollable display device 10 of an embodiment may include the housing 200 having the bent opening portion 220 and the grip 300 having the bent coupling recess 310 in order to prevent stress capable of generating defective panels or pixels from being applied to the pixels of the flexible display panel 100, thereby improving the display quality.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A rollable display device, comprising:
a flexible display panel displaying an image, the flexible display panel being rollable around a reel core to be in a rolled state;
a housing accommodating the flexible display panel in the rolled state, the housing having a bent opening portion through which the flexible display panel is pulled out; and
a grip attached to the flexible display panel, the grip pulling the flexible display panel out of the housing by an external force.

2. The rollable display device as claimed in claim 1, wherein a radius of curvature of the pulled out display panel in an unrolled state is equal to that of the bent opening portion.

3. A rollable display device, comprising:
a flexible display panel displaying an image;
a housing accommodating the flexible display panel in a rolled state, the housing having a bent opening portion through which the flexible display panel is pulled out; and
a grip attached to the flexible display panel, the grip pulling the flexible display panel out of the housing by an external force,
wherein the bent opening portion includes:
a first opening portion line;
a second opening portion line spaced apart from the first opening portion line;
a third opening portion line connected to each of the first opening portion line and the second opening portion line; and
a fourth opening portion line connected to each of the first opening portion line and the second opening portion line, the fourth opening portion line being spaced apart from the third opening portion line,
wherein each of the first opening portion line and the second opening portion line is bent.

4. The rollable display device as claimed in claim 3, wherein each of the first opening portion line and the second opening portion line is a curved line, and each of the third opening portion line and the fourth opening portion line is a portion of a straight line.

5. The rollable display device as claimed in claim 3, wherein the first opening portion line has a first radius of curvature, and the second opening portion line has a second radius of curvature greater than the first radius of curvature.

6. The rollable display device as claimed in claim 3, wherein the third opening portion line and the fourth opening portion line are parallel to each other.

7. The rollable display device as claimed in claim 1, wherein the bent opening portion has a uniform width.

8. A rollable display device, comprising:
a flexible display panel displaying an image;
a housing accommodating the flexible display panel in a rolled state, the housing having a bent opening portion through which the flexible display panel is pulled out; and
a grip attached to the flexible display panel, the grip pulling the flexible display panel out of the housing by an external force, wherein the grip has a bent coupling recess connected to the flexible display panel.

9. The rollable display device as claimed in claim 8, wherein the coupling recess has a radius of curvature.

10. The rollable display device as claimed in claim 8, wherein the flexible display panel includes:
- an inner panel stored in the housing;
- an external panel exposed outside of the housing; and
- a connection panel connecting the inner panel to the external panel, each of the external panel and the connection panel being bent.

11. The rollable display device as claimed in claim 10, wherein each of the external panel and the connection panel has a radius of curvature.

12. The rollable display device as claimed in claim 10, wherein the external panel has a multi-radius curvature that gradually decreases from the grip toward the housing.

13. The rollable display device as claimed in claim 10, wherein:
- the connection panel passes through the opening portion, and
- the external panel includes:
  - a first display panel coupled to the coupling recess, and
  - a second display panel connected to each of the connection display unit and the first display panel, each of the first display panel and the second display panel being bent.

14. The rollable display device as claimed in claim 13, wherein:
- the connection panel has a third radius of curvature,
- the first display panel has a fourth radius of curvature, and
- the second display panel has a fifth radius of curvature, the third radius of curvature being smaller than the fifth radius of curvature.

15. The rollable display device as claimed in claim 14, wherein the third radius of curvature is smaller than the fourth radius of curvature, and the fifth radius of curvature is smaller than the fourth radius of curvature.

16. The rollable display device as claimed in claim 8, wherein the coupling recess includes:
- a first coupling recess line;
- a second coupling recess line spaced apart from the first coupling recess line;
- a third coupling recess line connected to each of the first coupling recess line and the second coupling recess line; and
- a fourth coupling recess line connected to each of the first coupling recess line and the second coupling recess line, the fourth coupling recess line being spaced apart from the third coupling recess line, and each of the third coupling recess line and the fourth coupling recess line being bent.

17. The rollable display device as claimed in claim 16, wherein each of the first coupling recess line and the second coupling recess line is a curved line, and each of the third coupling recess line and the fourth coupling recess line is a portion of a straight line.

18. The rollable display device as claimed in claim 16, wherein the first coupling recess line has a sixth radius of curvature, and the second coupling recess line has a seventh radius of curvature greater than the sixth radius of curvature.

19. The rollable display device as claimed in claim 18, wherein the sixth radius of curvature is greater than the first radius of curvature, and the seventh radius of curvature is greater than the second radius of curvature.

20. The rollable display device as claimed in claim 16, wherein the third coupling recess line and the fourth coupling recess line are parallel to each other.

\* \* \* \* \*